(12) United States Patent
Hübner

(10) Patent No.: US 10,573,916 B2
(45) Date of Patent: Feb. 25, 2020

(54) MEMBRANE, MEMBRANE-ELECTRODE ASSEMBLY, FUEL CELL AND METHOD FOR PRODUCING A MEMBRANE

(71) Applicants: AUDI AG, Ingolstadt (DE); Volkswagen AG, Wolfsburg (DE)

(72) Inventor: Gerold Hübner, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 16/075,507

(22) PCT Filed: Feb. 1, 2017

(86) PCT No.: PCT/EP2017/052174
§ 371 (c)(1),
(2) Date: Aug. 3, 2018

(87) PCT Pub. No.: WO2017/134117
PCT Pub. Date: Aug. 10, 2017

(65) Prior Publication Data
US 2019/0044170 A1 Feb. 7, 2019

(30) Foreign Application Priority Data
Feb. 5, 2016 (DE) .................. 10 2016 102 088

(51) Int. Cl.
| | | |
|---|---|---|
| *H01M 8/1053* | (2016.01) | |
| *H01M 8/1023* | (2016.01) | |
| *H01M 8/1039* | (2016.01) | |
| *H01M 8/1067* | (2016.01) | |
| *H01M 8/1069* | (2016.01) | |
| *C08J 5/22* | (2006.01) | |
| *H01M 8/1018* | (2016.01) | |

(52) U.S. Cl.
CPC ......... *H01M 8/1053* (2013.01); *C08J 5/2281* (2013.01); *H01M 8/1023* (2013.01); *H01M 8/1039* (2013.01); *H01M 8/1067* (2013.01); *H01M 8/1069* (2013.01); *C08J 2327/12* (2013.01); *H01M 2008/1095* (2013.01)

(58) Field of Classification Search
CPC ............ H01M 8/1023; H01M 8/1039; H01M 8/1053; H01M 8/1067; H01M 8/1069; H01M 2004/1095; C08J 5/2281; C08J 2327/12
See application file for complete search history.

(56) References Cited

U.S. PATENT DOCUMENTS

| | | | |
|---|---|---|---|
| 9,083,049 B2 * | 7/2015 | Fuller ................. | H01M 4/8652 |
| 2011/0111321 A1* | 5/2011 | Yang ...................... | B01D 71/82 |
| | | | 429/483 |
| 2014/0004445 A1 | 1/2014 | Tsai et al. | |
| 2014/0315117 A1 | 10/2014 | O'Malley et al. | |
| 2015/0180073 A1 | 6/2015 | Frost et al. | |

FOREIGN PATENT DOCUMENTS

| | | |
|---|---|---|
| DE | 199 17 812 C2 | 11/2002 |
| DE | 10 2007 060 719 A1 | 6/2009 |
| DE | 10 2013 207 900 A1 | 10/2014 |
| JP | 2008-522365 A | 6/2008 |
| JP | 2015-8128 A | 1/2015 |
| JP | 2015-529383 A | 10/2015 |
| WO | WO 2015/155979 | * 10/2015 |

OTHER PUBLICATIONS

Cerium Oxide Powder (CeO2), Reade International Corp, 2018 (Year: 2018).*

* cited by examiner

*Primary Examiner* — Anca Eoff
(74) *Attorney, Agent, or Firm* — Seed IP Law Group LLP

(57) ABSTRACT

In order to provide a membrane (100) for a membrane-electrode assembly (MEA) of a fuel cell, comprising two partial membranes (200, 300), which allows for a simpler water circuit compared to the prior art, it is proposed that the partial membranes (200, 300) have different ion exchange capacities (IECs) and/or one partial membrane (200) consists of a perfluorosulfonic acid polymer (PFSA) and the other partial membrane (300) consists of a sulfonated hydrocarbon polymer (HC). Optionally, the membrane can contain a porous carrier film (600). Moreover disclosed are a method for producing the membrane (100) as well as a membrane-electrode assembly and a fuel cell.

19 Claims, 1 Drawing Sheet

MEMBRANE, MEMBRANE-ELECTRODE ASSEMBLY, FUEL CELL AND METHOD FOR PRODUCING A MEMBRANE

BACKGROUND

Technical Field

The invention relates to a membrane for a membrane-electrode assembly (MEA) of a fuel cell, comprising two partial membranes, to a membrane-electrode assembly, a fuel cell, and a method for producing a membrane for a membrane-electrode assembly.

Description of the Related Art

Fuel cells use the chemical conversion of a fuel with oxygen into water in order to generate electrical energy. For this purpose, fuel cells contain the so-called membrane-electrode assembly (MEA) as a core component, which is an arrangement of an ion-conducting (usually proton-conducting) membrane and of a catalytic electrode (anode and cathode) respectively arranged on both sides of the membrane. The electrodes generally comprise supported precious metals, in particular platinum. Depending on the design, the arrangement is sometimes also called catalyst-coated membrane (CCM). In addition, gas diffusion layers (GDL) can be arranged on both sides of the membrane-electrode assembly on the sides of the electrodes facing away from the membrane. Generally, the fuel cell is formed by a plurality of individual MEA cells which are arranged in the stack and the electrical power outputs of which add up. Bipolar plates (also called flow field plates or separator plates), which ensure a supply of the individual cells with the operating media, i.e., the reactants, and which are usually also used for cooling, are generally arranged between the individual membrane-electrode assemblies. In addition, the bipolar plates also ensure an electrically conductive contact to the membrane-electrode assemblies.

During operation of the fuel cell, the fuel (anode operating medium), particularly hydrogen $H_2$ or a gas mixture containing hydrogen, is supplied to the anode via an open flow field of the bipolar plate on the anode side, where electrochemical oxidation of $H_2$ to protons $H^+$ with loss of electrons takes place ($H_2 \rightarrow 2H^+ + 2\ e^-$). Protons are transported (in a water-bound or water-free manner) from the anode chamber into the cathode chamber via the electrolyte or membrane that separates and electrically insulates the reaction chambers in a gas-tight manner from each other. The electrons provided at the anode are guided to the cathode via an electrical line. The cathode receives, as cathode operating medium, oxygen or a gas mixture containing oxygen (such as air) via an open flow field of the bipolar plate on the cathode side so that a reduction of $O_2$ to $O^{2-}$ with gain of electrons takes place ($\frac{1}{2}O_2 + 2\ e^- \rightarrow O^{2-}$). At the same time, the oxygen anions react in the cathode chamber with the protons transported across the membrane to form water ($O^{2-} + 2\ H^+ \rightarrow H_2O$).

The fuel cell stack is supplied with its operating media, that is the anode operating gas (hydrogen for example), the cathode operating gas (air for example), and the coolant by means of the main supply channels, which run through the stack in its entire stack direction and from which the operating media are supplied to the individual cells via the bipolar plates. There are at least two such main supply channels available for each operating medium, namely one for supplying and one for discharging the respective operating medium.

For the stable operation of a fuel-cell system, a specific water circuit within a membrane-electrode assembly by various measures is, among other things, an important criterion since the membrane-electrode assembly may neither dry out nor have high humidity. The water circuit relates to the water formed in the cathode chamber and also to externally supplied water, wherein external humidification of the membrane-electrode assembly may, where applicable, be dispensed with as a result of a specific water transport to the anode or cathode. Furthermore, the risk of damage to the electrode by fuel starvation (lack of reactant) must be minimized, e.g., by water discharge from the region of the anode.

For guiding water within the membrane-electrode assembly, it is known to use thinner than unusual membranes, which allow an easy water exchange between the anode and cathode, wherein thinner membranes however decrease the efficiency of the cell and are more unstable mechanically.

It is also known to provide water for humidification of the membrane by specific recombination of reaction gases. For example, DE 199 17 812 C2 describes a membrane-electrode assembly for a fuel cell, in which membrane-electrode assembly is provided a catalyst layer which is localized within the membrane and at which a recombination takes place in order to generate water. The membrane may consist of two partial membranes which are made of Nafion® and which are stacked on top of each other after the catalyst layer is arranged.

Fuel-cell membranes are otherwise generally homogeneously made of a chemically and physically uniform polymer electrolyte, wherein a porous carrier film, e.g., based on e-PTFE (expanded polytetrafluoroethylene), can be enclosed.

Used as material for the polymer electrolyte are in many cases perfluorosulfonic acid polymers (PFSA membranes) or even sulfonated hydrocarbon polymers (HC membranes). These polymer electrolytes are characterized by their ion exchange capacity (IEC), which depends on the concentration of sulfonic acid groups in the polymer.

The PFSA membranes have the advantage of a higher chemical stability compared to the hydrocarbon membranes, in particular with respect to the oxygen radicals preferably formed at the fuel-cell cathode, whereas the hydrocarbon membranes have the advantage of lower gas permeation with the same thickness of the membrane in comparison to the perfluorosulfonic acid membranes and of more cost-effective base materials.

BRIEF SUMMARY

The invention is now based on the task of providing, for a membrane-electrode assembly, membranes that allow a simpler water circuit compared to the prior art.

According to the invention, the task is achieved by means of a membrane with the features of claim 1.

Provided is a membrane for a membrane-electrode assembly of a fuel cell, which membrane consists of two coated partial membranes, wherein the partial membranes have different ion exchange capacities (I ECs) and/or a first partial membrane consists of a perfluorosulfonic acid polymer (PFSA) and a second partial membrane consists of a sulfonated hydrocarbon polymer (HC).

The combination of partial membranes made of perfluorosulfonic acid polymer (PFSA) and of a sulfonated hydrocarbon polymer (HC) is a particularly preferred embodiment of the invention since the advantage of lower gas permeation of the hydrocarbon membrane can be combined by this combination with the higher oxidative stability of the perfluorosulfonic acid membrane.

Otherwise, the different water accumulation and need on the anode and cathode side of an MEA can advantageously easily be controlled by the design of a membrane according to the invention.

The membrane according to the invention preferably comprises one or two, particularly preferred one, porous carrier film(s) for stabilizing the membrane, which carrier film is arranged between the partial membranes or preferably within one or both partial membranes. Two carrier films are provided in case both partial membranes must be stabilized before final assembly of the membrane. The carrier film(s) is/are preferably respectively impregnated with an appropriate ionomer. The ionomer preferably corresponds to the ionomers used for the production of the partial membranes. The carrier film itself preferably consists of e-PTFE (expanded polytetrafluoroethylene).

As a result of the structure of the membrane according to the invention, a total thickness can preferably be realized that corresponds to or advantageously is even less than that of membranes from the prior art so that fuel-cell stacks that comprise the membranes according to the invention require less space compared to the fuel-cell stacks with known membranes. The membrane according to the invention preferably has a total thickness between 4 to 20 μm, particularly preferably of 10 to 20 μm. In this case, the partial membranes preferably have an individual thickness of preferably 2-10 μm and particularly preferably of 5-10 μm.

According to a particularly preferred embodiment of the membrane according to the invention, the partial membranes may moreover differ from each other in other material properties, which may have influence on the water circuit, among other things. These properties are preferably the thickness of the partial membranes, their porosity, and/or the density of the pores. By varying these material properties in the partial membranes, the pass-through speed of the water and gases through the partial membranes can advantageously be controlled.

According to another particularly preferred embodiment of the membrane, different additives of different concentrations can be introduced into or applied in the partial membranes.

These additives may preferably be hygroscopic particles or fibers made of a material such as $ZrO_2$, $SiO_2$, and/or $TiO_2$, which advantageously serve to store the water originating from the cell reaction in order to ensure a defined humidity of the membrane or of the partial membranes.

A sufficient/defined humidity is necessary in order to ensure proton conductivity. Water is generally bound in the membranes by the sulfonic acid groups of the polymers used for the membranes so that sufficient proton conductivity is provided. At higher operating temperatures and/or at higher operating pressure, the water formed in the cell reaction is however not sufficiently bound and the membranes dry out so that power losses result on account of the reduced proton conductivity of the membrane. These disadvantages can be avoided by the use according to the invention of hygroscopic particles or fibers in the partial membranes.

A catalyst may also preferably be one of these additives in order to provide water in a specific manner in the partial membranes by recombination of the reactants. To this end, pure platinum or a platinum/carbon compound or any other catalyst that allows a controlled recombination of $H_2$ and $O_2$ can be used.

Included in these additives are preferably also radical scavengers since the membrane is susceptible to damage or decomposition by peroxide anions and radicals that can be formed in the fuel cell. In particular on the cathode side of the membrane, peroxide forms as a result of side reactions, where these additives then must be provided, wherein these additives can however also be produced on the anode side.

Any combination of radical scavengers and substances that decompose peroxide can be added to the partial membranes in order to remove harmful peroxide radical substances.

Such additives are known to the person skilled in the art. These can, for example, be phenol derivatives, certain amines and the like, and preferably metal oxides. Particularly preferably added are cerium oxide particles or cerium oxide salts of micrometer or nanometer size. These additives reduce the affinity to form or accelerate the decomposition of oxygenous radicals in the region of the electrodes.

Preferably additionally used is a substance that binds the metal ions catalyzing the Fenton reaction. In the Fenton reaction, hydroxyl radicals are formed by the reduction of hydrogen peroxide. These are, for example, iron, nickel, cobalt, and copper ions. In the fuel cell, in particular iron(II) ions, which can, for example, be released by corrosion of the bipolar plates of a fuel cell, are problematic. Suitable additives are known to the person skilled in the art from the prior art. These can, for example, be chelating agents.

The metal ion-binding additives can be used in both partial membranes. Preferably in fluorine-containing membranes in order to thereby prevent decomposition of the partial membrane along with the associated release of fluoride-containing decomposition products.

The aforementioned material properties and/or additives can be distributed homogeneously in the partial membranes. Their concentrations in the partial membranes can advantageously have a gradient, the direction of which preferably corresponds, for example, to the direction of flow of one or both fuel gases in order to take into account or to compensate for their humidity changing in relation to the path.

Gradients orthogonal to the membrane may naturally also be formed in order to, for example, in particular catalyze the recombination of fuel gases to water within the entire membrane and not just on its surface.

One or more partial surfaces of the partial membranes may also be provided with the aforementioned properties or additives in order to allow for a need-based adaptation of the partial membranes.

The aforementioned properties and additives for optimizing the partial membranes are preferably provided independently of each other in the respective partial membrane(s).

The membrane according to the invention may preferably also comprise more than two partial membranes, which either all are different according to the aforementioned embodiments or wherein at least two partial membranes have the same properties and material properties.

As a result of this design of the membrane with more than two partial membranes, various effects can be achieved. For example, a membrane with a partial membrane arranged between other partial membranes can preferably be obtained as membrane core, which, together with the mentioned additives, has certain water-storing or hydrogen-oxidizing properties. This membrane core can in particular be loaded with materials that would otherwise have a damaging effect on the electrodes of an MEA.

According to the invention, a method for producing an above-described membrane for a membrane-electrode assembly (MEA) of a fuel cell is moreover introduced.

The Method is Characterized by the Following Step:

Forming of partial membranes that differ by different ion exchange capacities (IEC) and/or a first partial membrane is formed of a perfluorosulfonic acid polymer (PFSA) and a second partial membrane is formed of a sulfonated hydrocarbon polymer (HC).

The partial membranes moreover may, as described above, be modified according to the invention in order to satisfy various requirements, in particular with respect to the water circuit and stability.

In a preferred embodiment of the method, the partial membranes are formed by applying appropriate ionomer solutions on both sides of a carrier film and drying the ionomers.

The method can alternatively include the connecting of two separate partial membranes, e.g., by pressing.

At least one partial membrane can preferably be coated with a catalyst in order to form a corresponding membrane-electrode assembly. To this end, appropriate catalyst paste is applied onto one or both partial membranes and the solvent is extracted in a subsequent drying step. The obtained partial membranes coated with catalyst are assembled to form a catalyst-coated membrane (CCM).

The application of catalyst layers is also provided in the method variant with the application of appropriate ionomer solutions on both sides of a carrier film as well as the drying of the ionomers.

According to the invention, a membrane-electrode assembly and a fuel cell with a membrane-electrode assembly are finally claimed, wherein the membrane-electrode assembly comprises a membrane. The membrane is formed according to the invention and/or produced according to the method according to the invention.

The technical advantages of the membrane according to the invention are thereby transferred to the membrane-electrode assembly and the fuel cell.

Additional preferred embodiments of the invention arise from the remaining features mentioned in the dependent claims.

The various embodiments of the invention mentioned in this application may be combined advantageously with one another unless stated otherwise in individual cases.

BRIEF DESCRIPTION OF THE SEVERAL VIEWS OF THE DRAWING

The invention is explained below in exemplary embodiments in reference to the respective drawings. The following is shown.

DETAILED DESCRIPTION

The following exemplary embodiments of the present invention deal with the types of structures of a membrane for a membrane-electrode assembly of a fuel cell on the basis of two partial membranes differing in their chemical structure and/or in their physical properties. According to the invention, this relates to the ion exchange capacity of the partial membranes and/or their structure made of a perfluorosulfonic acid polymer and made of a sulfonated hydrocarbon polymer. The membrane may, for example, be formed by partial membranes placed on top of each other or by applying ionomers on both sides of a carrier film.

Figure 1:
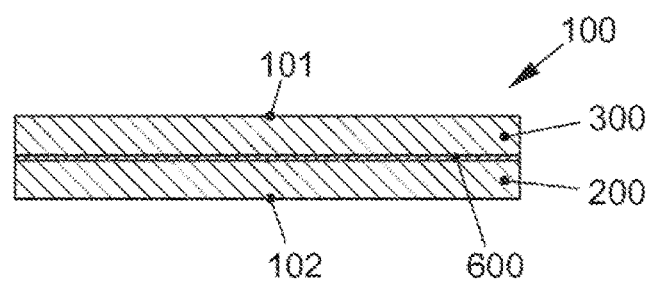
FIG. 1 a membrane according to the invention in a sectional view.

In a first exemplary embodiment, which is shown in FIG. 1, the structure of a proton-conducting membrane 100 consists of two thin partial membranes 200, 300 on a porous carrier film 600, the resulting total thickness of which corresponds to or can be less than that of a proton-conducting membrane according to the prior art. The carrier film 600 is optional and not essential for the nature of the present invention. Each partial membrane 200, 300 forms a membrane side 101, 102 of the membrane 100. The partial membranes 200, 300, and thus the membrane sides 101, 102, differ in their ion exchange capacity and/or by the polymer used for the partial membranes 100, 200.

In other developments, the partial membranes moreover differ in size and/or density of the pores. Additionally or alternatively, the difference can be in the material properties or additives that influence the water circuit and the stability of the partial membranes.

Figure 2:
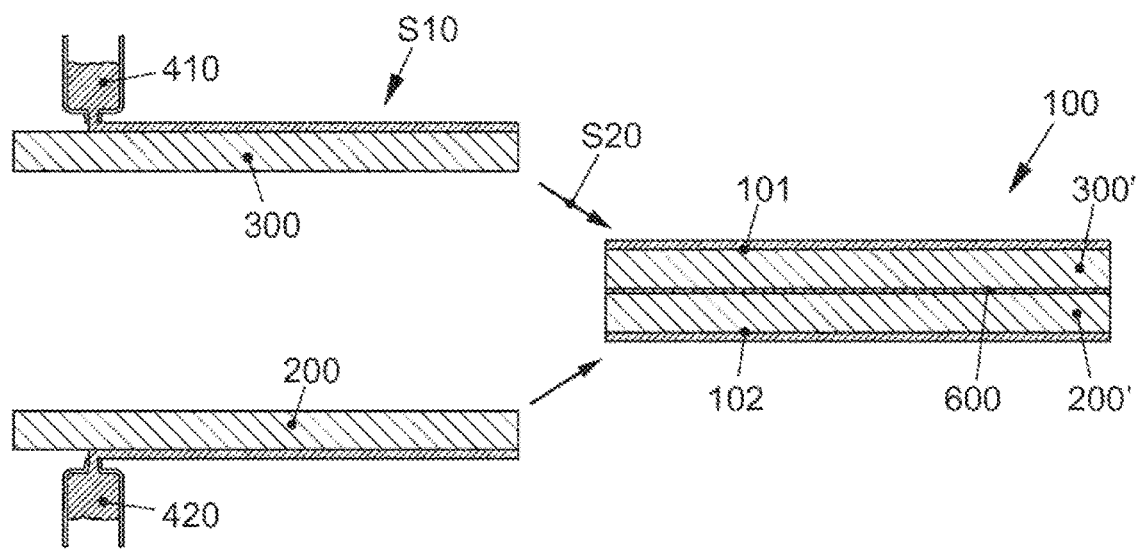
FIG. 2 the production of a second embodiment of the membrane according to the invention in sectional views, and FIG. 3 the production of a third embodiment of the membrane according to the invention in sectional views.

The production of a membrane 100 according to the invention with catalyst material 410, 420 applied onto both partial membranes 200, 300 is shown by way of example in FIG. 2. In a step S10, catalyst material 410, 420 from reservoirs is applied onto the sides of the partial membranes 200, 300 facing away from each other. In the subsequent step S20, a membrane 100 with catalyst-coated partial membranes 200', 300' is obtained. In the process, either a carrier film 600 already impregnated with an ionomer is advantageously arranged between the partial membranes 200, 300 and connected to them or one or both partial membranes 200, 300 respectively comprise(s) a carrier film 600, wherein this is not shown here. An embodiment not described here without carrier film is also possible.

Figure 3:
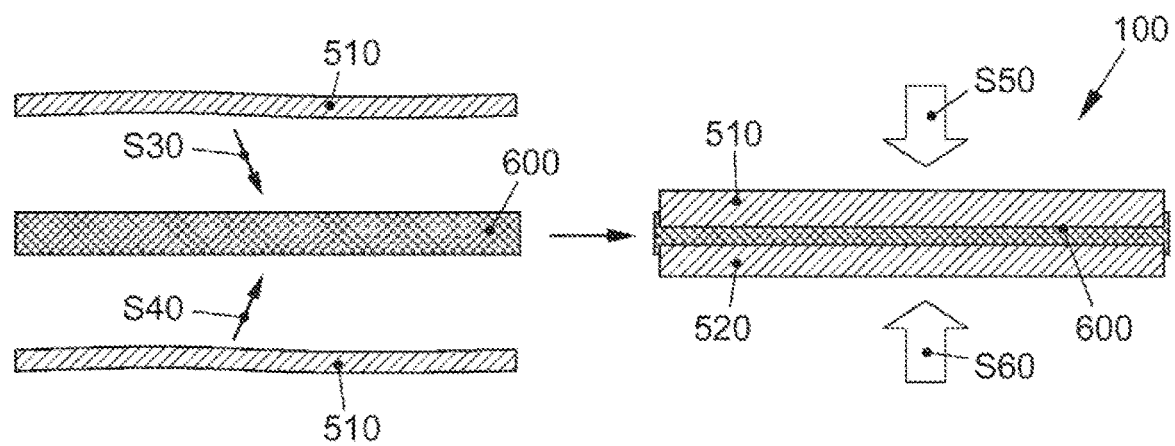

In a third exemplary embodiment, which is shown in FIG. 3, the sides of a polymer membrane 100 have different chemical and/or physical properties as a result of different drying methods in steps S50 and S60. The drying methods are used to dry optionally different ionomer solution(s) 510, 520 applied onto the two sides. These ionomer solutions were applied onto a carrier film 600 in previous steps S30, S40. The drying methods in S50, S60 differ in particular in that they result in different water transport properties of the dried membrane sides, e.g., with respect to the pore size and density.

The method according to the invention has the advantage of easy production. No modifications are required, which could result in damage to the membranes.

By combining two thin membranes with different ion exchange capacity of the different ionomers, a specific water transport in the MEA can be achieved. This can be exploited in order to transport product water from the cathode to the anode in order to allow for unhumidified operation there or vice versa in order to allow for flooding of the anode by extracting water from the anode.

By combining a hydrocarbon membrane on one electrode, preferably the anode, with a PFSA membrane on the other electrode, preferably the cathode, the advantage of lower gas permeation of the hydrocarbon membrane can be combined with the higher oxidative stability of the PFSA membrane.

As a result of the hybrid structure of the membrane, the connection of the membrane to the electrode can be optimized since the respective membrane side can be formed from the ionomers needed in the respective electrode.

The invention introduced here provides a membrane that can be produced by applying catalyst layers directly onto the respective anode or cathode partial membranes and by subsequently connecting the two catalyst-coated partial membranes by simply placing them on top of each other, or, where applicable, by hot-pressing them. In this way, it is possible to apply catalyst layers without carrier film.

LIST OF REFERENCE SYMBOLS

100 Membrane for membrane-electrode assembly
101, 102 Membrane sides
200, 300 Partial membranes
200', 300' Catalyst-coated partial polymer membranes
410, 420 Catalyst material
510, 520 Ionomer material
600 Carrier film
S10 Applying catalyst
S20 Connecting
S30, S40 Applying ionomer
S50, S60 Drying

The invention claimed is:

1. A membrane for a membrane-electrode assembly of a fuel cell, comprising:
 a first partial membrane formed of a perfluorosulfonic acid polymer;
 a second partial membrane formed of a sulfonated hydrocarbon polymer; and
 a third partial membrane formed of an ionomer and positioned between the first partial membrane and the second partial membrane;
 wherein the first and second partial membranes are impregnated with one or more additives that bind metal ions catalyzing the Fenton reaction, and
 wherein the third partial membrane is impregnated with hygroscopic particles or fibers.

2. The membrane according to claim 1, wherein the first and second partial membranes differ in thickness.

3. The membrane according to claim 1, wherein the first and second partial membranes differ with respect to concentration of at least one of the one or more additives that bind metal ions catalyzing the Fenton reaction.

4. The membrane according to claim 1, wherein the first partial membrane is further impregnated with at least one of: hygroscopic particles or fibers, radical scavengers, or catalysts for recombining hydrogen and oxygen.

5. The membrane according to claim 1, wherein at least one or two porous carrier films are arranged between the first and second partial membranes.

6. The membrane according to claim 1, wherein the hygroscopic particles or fibers include one or more of: $ZrO_2$, $SiO_2$, and $TiO_2$.

7. The membrane according to claim 1, wherein the second partial membrane is further impregnated with at least one of: hygroscopic particles or fibers, radical scavengers, or catalysts for recombining hydrogen and oxygen.

8. A method for producing a membrane for a membrane-electrode assembly of a fuel cell, comprising:
 forming first and second partial membranes around a third partial membrane of the membrane,
  wherein the first partial membrane is formed of perfluorosulfonic acid polymer, the second partial membrane is formed of sulfonated hydrocarbon polymer, and the third partial membrane is formed of an ionomer, and
  wherein the first and second partial membranes are impregnated with one or more additives that bind metal ions catalyzing the Fenton reaction,
  wherein the third partial membrane is impregnated with hygroscopic particles or fibers.

9. The method according to claim 8, wherein forming the first and the second partial membranes around the third partial membrane of the membrane comprises:

applying a solution of the perfluorosulfonic acid polymer to a first side of the third partial membrane, and applying a solution of the sulfonated hydrocarbon polymer to a second side of the third partial membrane, the third partial membrane formed within a carrier film; and
 drying both sides of the third partial membrane.

10. The method according to claim 8, wherein the hygroscopic particles or fibers include one or more of: $ZrO_2$, $SiO_2$, and $TiO_2$.

11. A membrane-electrode assembly, comprising:
 a cathode;
 an anode; and
 a membrane including:
  a first partial membrane formed of a perfluorosulfonic acid polymer, the first partial membrane adjacent to the cathode;
  a second partial membrane formed of a sulfonated hydrocarbon polymer, the second partial membrane adjacent to the anode; and
  a third partial membrane formed of an ionomer and positioned between the first partial membrane and the second partial membrane,
  wherein the first and second partial membranes are impregnated with one or more additives that bind metal ions catalyzing the Fenton reaction,
  wherein the third partial membrane is impregnated with hygroscopic particles or fibers.

12. The membrane-electrode assembly according to claim 11, wherein the hygroscopic particles or fibers include one or more of: $ZrO_2$, $SiO_2$, and $TiO_2$.

13. The membrane-electrode assembly according to claim 11, wherein the first and second partial membranes differ in thickness.

14. The membrane-electrode assembly according to claim 11, wherein the first and second partial membranes differ respect to concentration of at least one of the one or more additives that bind metal ions catalyzing the Fenton reaction.

15. The membrane-electrode assembly according to claim 11, wherein the first partial membrane is further impregnated with at least one of the following: hygroscopic particles or fibers, radical scavengers, or catalysts for recombining hydrogen and oxygen.

16. The membrane-electrode assembly according to claim 11, wherein the second partial membrane is further impregnated with at least one of:
 hygroscopic particles or fibers, radical scavengers, or catalysts for recombining hydrogen and oxygen.

17. The membrane-electrode assembly according to claim 11, wherein at least one or two porous carrier films are arranged between the first and second partial membranes.

18. A fuel cell having a membrane-electrode assembly, wherein the membrane-electrode assembly comprises:
 a cathode;
 an anode; and
 a membrane including:
  a first partial membrane formed of a perfluorosulfonic acid polymer, a second partial membrane formed of a sulfonated hydrocarbon polymer, and a third partial membrane formed of an ionomer;
  wherein the first and second partial membranes are impregnated with additives that bind metal ions catalyzing the Fenton reaction,
  wherein the third partial membrane is impregnated with hygroscopic particles or fibers.

19. The fuel cell according to claim 18, wherein the hygroscopic particles or fibers include one or more of: $ZrO_2$, $SiO_2$, and $TiO_2$.

* * * * *